United States Patent
Murase et al.

(10) Patent No.: US 11,686,713 B2
(45) Date of Patent: Jun. 27, 2023

(54) GLYCOPEPTIDE ANALYZER

(71) Applicant: SHIMADZU CORPORATION, Kyoto (JP)

(72) Inventors: Masaki Murase, Kyoto (JP); Takashi Nishikaze, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 419 days.

(21) Appl. No.: 17/094,912

(22) Filed: Nov. 11, 2020

(65) Prior Publication Data

US 2021/0208117 A1 Jul. 8, 2021

(30) Foreign Application Priority Data

Nov. 21, 2019 (JP) .................. 2019-210660

(51) Int. Cl.
*G01N 30/88* (2006.01)
*G01N 30/86* (2006.01)

(52) U.S. Cl.
CPC ............. *G01N 30/88* (2013.01); *G01N 30/86* (2013.01); *G01N 2030/8831* (2013.01);
(Continued)

(58) Field of Classification Search
CPC ................... G01N 30/88; G01N 30/86; G01N 2030/8831; G01N 2440/38;
(Continued)

(56) References Cited

U.S. PATENT DOCUMENTS

2018/0059094 A1 3/2018 Nishikaze
2019/0120793 A1 4/2019 Nishikaze
(Continued)

FOREIGN PATENT DOCUMENTS

CN 106018535 A 10/2016
CN 109830426 A 5/2019
(Continued)

OTHER PUBLICATIONS

Office Action dated May 7, 2022 from the China National Intellectual Property Administration in CN Machine Application No. 202011313335.0.
(Continued)

*Primary Examiner* — Jennifer Wecker
*Assistant Examiner* — Michael Paul Shimek
(74) *Attorney, Agent, or Firm* — Sughrue Mion, PLLC (57) ABSTRACT

A glycopeptide analyzer that performs a structural analysis on glycoforms of a glycoprotein, including: a spectrum creator creating an MS/MS spectrum for each elution time based on data acquired by an LC/MS analysis of a sample containing glycopeptides originating from a target glycoprotein; a peptide mass calculator selecting a glycopeptide-related spectrum from a plurality of MS/MS spectra and calculating the mass of a peptide from the selected spectrum; a similarity determiner determining a similarity between the glycopeptide-related spectrum and each of the other MS/MS spectra; an elution-time range estimator estimating an elution-time range based on a distribution of the frequency of occurrence of an MS/MS spectrum for which a high level of similarity has been determined on a time axis; and a glycan composition estimator selecting an ion peak corresponding to a mass equal to or greater than a peptide mass and estimating a glycan composition based on the peak.

10 Claims, 8 Drawing Sheets

(52) U.S. Cl.
CPC ..... *G01N 2440/38* (2013.01); *G01N 2560/00* (2013.01); *G01N 2570/00* (2013.01)

(58) Field of Classification Search
CPC ........... G01N 2560/00; G01N 2570/00; G01N 30/8682; G01N 30/02; G01N 30/38; G01N 30/72
See application file for complete search history.

(56) References Cited

U.S. PATENT DOCUMENTS

2020/0266041 A1    8/2020   Zhang et al.
2020/0378982 A1*  12/2020   Ohta .................. G01N 30/8696

FOREIGN PATENT DOCUMENTS

| JP | 2008-298427 A | 12/2008 | |
|----|---------------|---------|---|
| JP | 2016-194500 A | 11/2016 | |
| WO | 2017/145496 A1 | 8/2017 | |
| WO | WO-2018034346 A1 * | 2/2018 | ............ C07K 16/00 |
| WO | 2020/079878 A1 | 4/2020 | |

OTHER PUBLICATIONS

Japanese Decision to Grant dated Jan. 10, 2023 in Japanese Application No. 2019-210660.

Masaki Murase et al.,, "Data-Dependent Acquisition System for N-linked Glycopeptides using MALDI-DIT-TOF MS", International Mass Spectrometry Conference, 2012, Poster Session PWe-058.

Kai Maass et al., ""Glyco-peakfinder"—de novo composition analysis of glycoconjugates", Proteomics, 2007, pp. 4435-4444, vol. 7, No. 24.

Second Office Action dated Jan. 28, 2023 issued for the corresponding Chinese Application No. 202011313335.0.

* cited by examiner

GLYCOPEPTIDE ANALYZER

CROSS REFERENCE TO RELATED APPLICATIONS

This application is claiming priority based on Japanese Patent Application No. 2019-210660 filed on Nov. 21, 2019.

TECHNICAL FIELD

The present invention relates to a glycopeptide analyzer, and more specifically, to a device for analyzing the structure of a glycan in a glycopeptide or glycoprotein using chromatograph mass spectrometry.

BACKGROUND ART

In eukaryotes, many proteins which are present in a living organism are glycosylated and take the form of glycoproteins. The glycosylation plays an important role in the regulation of the structure and function of proteins. Recent studies have revealed relations between various diseases (e.g. immunological diseases) and abnormal glycan structures or saccharification. From these facts, structural analysis of glycoproteins and glycopeptides is extremely important in various areas, such as bioscience, medical treatment, and drug development.

Glycans vary extremely in structure. A glycoprotein has a considerable number of isomers (glycoforms) which have a common primary structure yet differ from each other in glycan structure or glycosylation site. A difference in glycan structure or form of the addition of the glycan causes a change in the physical and/or chemical nature of the glycoprotein, producing a significant influence on the physiological role of the glycoprotein. Therefore, an analysis of a difference in glycan structure or glycosylation site is essential for the functional analysis of glycoproteins, and an established technique has been demanded for exhaustively analyzing glycoforms.

A conventional and common procedure for the glycan analysis of a glycoprotein is as follows:

(1) The glycoprotein is purified.
(2) The glycoprotein is decomposed into glycopeptides by enzymatic digestion to obtain a peptide mixture.
(3) The glycopeptides are selectively extracted from the peptide mixture and enriched.
(4) The glycopeptides are separated into individual glycopeptides having different amino-acid sequences (or other features) by a liquid chromatograph (LC) using a reverse-phase column.
(5) The glycopeptides separated by the LC are individually fed to a mass spectrometer subjected to an MS/MS analysis to acquire an MS/MS spectrum.
(6) An analysis of MS/MS spectra is performed to analyze the composition and structure of the glycan.

For the aforementioned MS/MS analysis, a technique called the "data dependent acquisition" (DDA) is useful (for example, see Patent Literature 1 or Non Patent Literature 1). In this technique, a mass spectrometric analysis with no dissociation of ions (MS analysis) is initially performed. A peak that satisfies a predetermined condition, such as the peak having the enough signal intensity, is extracted from a mass spectrum acquired by the MS analysis, and an MS/MS analysis with the extracted peak as the target is subsequently and automatically performed. However, such a conventional method for glycan analysis has a problem as follows.

CITATION LIST

Patent Literature

Patent Literature 1: JP 2008-298427 A
Patent Literature 2: JP 2016-194500 A
Patent Literature 3: WO 2017/145496 A

NON PATENT LITERATURE

Non Patent Literature 1: Murase and six other authors, "Data-dependent acquisition system for N-linked glycopeptides using MALDI-DIT-TOF MS", International Mass Spectrometry Conference, 2012, Poster Session PWe-058
Non Patent Literature 2: K. Maass and four other authors, "Glyco-peakfinder" de novo composition analysis of glycoconjugates, *Proteomics,* 2007, Vol. 7, No. 24, pp. 4435-4444

SUMMARY OF INVENTION

Technical Problem

In the case of separating glycopeptides by a reverse-phase column, glycoforms having the same peptide structure are likely to be eluted at comparatively close points in time. Therefore, if an MS/MS analysis is performed by data dependent acquisition, it is often the case that MS/MS spectra can be obtained only for some glycoforms which have been ionized, due to the limited throughput of the mass spectrometer. In that case, it is impossible to analyze the glycan structure of the remaining glycoforms for which the MS/MS analysis could not be performed. This forms an obstacle to an exhaustive analysis of glycoforms. Accordingly, a technique is needed which enables an exhaustive analysis of the glycoforms originating from one glycoprotein based on the collected data even when the MS/MS analysis could not be performed for some of the glycoforms.

In order to narrow down appropriate structural candidates, it is useful to predict the glycan structure on the assumption that, if there is an MS spectrum for which the MS/MS analysis could not be performed, the origin of an ion peak detected in that MS spectrum is a glycoform whose amino-acid sequence is identical to that of a glycopeptide whose structural information (e.g. peptide mass) has been successfully predicted from an MS/MS spectrum measured at an elution time comparatively close to the aforementioned MS spectrum. However, the elution time of a glycoform depends on not only the kind of peptide; it also varies depending on the chemical properties or structure of the glycan. Furthermore, as described in Patent Literature 2 or 3, a glycan analysis may include various chemical modifications to the glycan, in which case the elution time of the glycoform can also vary depending on the kind of chemical modification. Additionally, the amount of such a variation in elution time is different for peptides having different amino-acid sequences.

Therefore, even in the case of separating glycoforms originating from one glycoprotein under the same LC condition, it is necessary to previously estimate the elution-time range of the glycoforms for each peptide and perform a glycan analysis corresponding to a glycoform for which structural information has been obtained based on an MS/MS spectrum acquired within that elution-time range. Estimating the elution-time range of the glycoforms for each peptide is cumbersome. Furthermore, it is difficult to estimate this elution-time range with a high level of accuracy.

The present invention has been developed to solve the previously described problem. Its primary objective is to provide a glycopeptide analyzer which can easily yet accurately estimate the elution-time range of glycoforms for each peptide originating from one glycoprotein, thereby improving the performance of the glycan analysis in terms of the exhaustiveness of the glycoforms.

Solution to Problem

A glycopeptide analyzer according to the first mode of the present invention developed for solving the previously described problem is a glycopeptide analyzer configured to perform a structural analysis on the glycoforms of a glycoprotein using an analyzing device including a liquid chromatograph coupled with a mass spectrometer capable of MS/MS analysis, the glycopeptide analyzer including:

a spectrum creator configured to create an MS/MS spectrum for each elution time, based on data acquired by analyzing a sample containing glycopeptides originating from a target glycoprotein by the analyzing device;

a peptide mass calculator configured to select a glycopeptide-related spectrum which is likely to have originated from a glycopeptide, from a plurality of MS/MS spectra created by the spectrum creator for different elution times, and to calculate the mass of a peptide in the selected glycopeptide based on the glycopeptide-related spectrum;

a spectrum similarity determiner configured to determine a similarity between the glycopeptide-related spectrum and each of the other MS/MS spectra or each MS/MS spectrum corresponding to a specific range of time;

a glycoform-related spectrum selector configured to select, as a glycoform-related spectrum for the glycopeptide concerned, an MS/MS spectrum having a high level of similarity with the glycopeptide-related spectrum;

a glycoform elution-time range estimator configured to determine a distribution of the frequency of occurrence of the selected glycoform-related spectrum on a time axis, and to estimate a glycoform elution-time range based on the distribution; and a glycan composition estimator configured to select, from ion peaks detected on an MS spectrum collected within the estimated glycoform elution-time range, an ion peak corresponding to a mass greater than a peptide mass calculated by the peptide mass calculator, and to estimate a glycan composition by using the ion peak.

The "analyzing device including a liquid chromatograph coupled with a mass spectrometer capable of MS/MS analysis" may be a liquid chromatograph mass spectrometer (LC-MS) in which at least a portion of the eluate from the exit port of the column of the liquid chromatograph is introduced into the ionization unit of the mass spectrometer, or it may be a liquid chromatograph mass spectrometry system in which a fraction of the eluate from the exit port of the column of the liquid chromatograph is collected at each predetermined point in time to prepare a sample, and a mass spectrometric analysis of the sample is performed with a mass spectrometer having a matrix-assisted laser desorption/ionization source or similar type of ion source.

Typical examples of the devices useful as the "mass spectrometer capable of MS/MS analysis" include a device employing the combination of an ion trap and a time-of-flight mass spectrometer (TOFMS), a TOF/TOF mass spectrometer, a quadrupole time-of-flight (Q-TOF) mass spectrometer, and a triple quadrupole mass spectrometer.

Advantageous Effects of Invention

A group of glycoforms having the same peptide structure have only minor structural differences, such as a difference in glycosylation site or a slight difference in glycan structure. Therefore, MS/MS spectra obtained from those glycoforms normally have high levels of similarity in spectrum pattern. Accordingly, in the glycopeptide structure analyzer according to the previously described mode of the present invention, for example, the spectrum similarity determiner and the glycoform-related spectrum selector calculate a degree of similarity between an MS/MS spectrum which is likely to have originated from a glycopeptide (glycopeptide-related spectrum) and each of the other MS/MS spectra or each MS/MS spectrum corresponding to a specific range of time by a predetermined algorithm, and compare the degree of similarity with a previously determined threshold to extract MS/MS spectra (glycoform-related spectra) which are likely to have originated from glycoforms of one glycopeptide.

As noted earlier, although the wide variety of glycoforms which are identical to one glycopeptide in terms of peptide structure do not have the same elusion time, those glycoforms tend to be eluted at comparatively close points in time. Therefore, if the distribution of the frequency of occurrence, i.e. the histogram, of the large number of selected glycoform-related spectra is created on the time axis, a peak appears on the histogram. The elution-time range corresponding to this peak can be considered to be an elution-time range within which the target group of glycoforms, i.e. the glycoforms having the same peptide structure, are likely to be eluted with a high level of probability. Accordingly, for example, the glycoform elution-time range estimator estimates a glycoform elution-time range based on a rough width of the peak on the aforementioned histogram.

Within this glycoform elution-time range, a glycoform may possibly be eluted for which an MS spectrum has been acquired but no MS/MS spectrum has been acquired for some reason, such as the limited throughput of the mass spectrometer. Accordingly, the glycan composition estimator estimates the glycan composition using an ion peak detected on an MS spectrum collected within the glycoform elution-time range, not on the MS/MS spectrum.

The glycopeptide analyzer according to the previously described mode of the present invention can easily yet accurately estimate the elution-time range of glycoforms for each peptide based on an objective index, i.e. a degree of spectral similarity. This enables the estimation of the glycan composition of each glycoform without omission, from an enormous amount of data collected from a sample of the glycopeptide and peptide mixtures. Conversely, MS spectra which are unlikely to include a glycoform related to a glycopeptide can be excluded from the target of the estimation of the glycan composition. This reduces the amount of time required for the estimation of the glycan composition as well as improves the estimation accuracy. The amount of time and labor for verifying the results of the estimation of the glycan composition can also be reduced.

DESCRIPTION OF EMBODIMENTS

Figure 1:
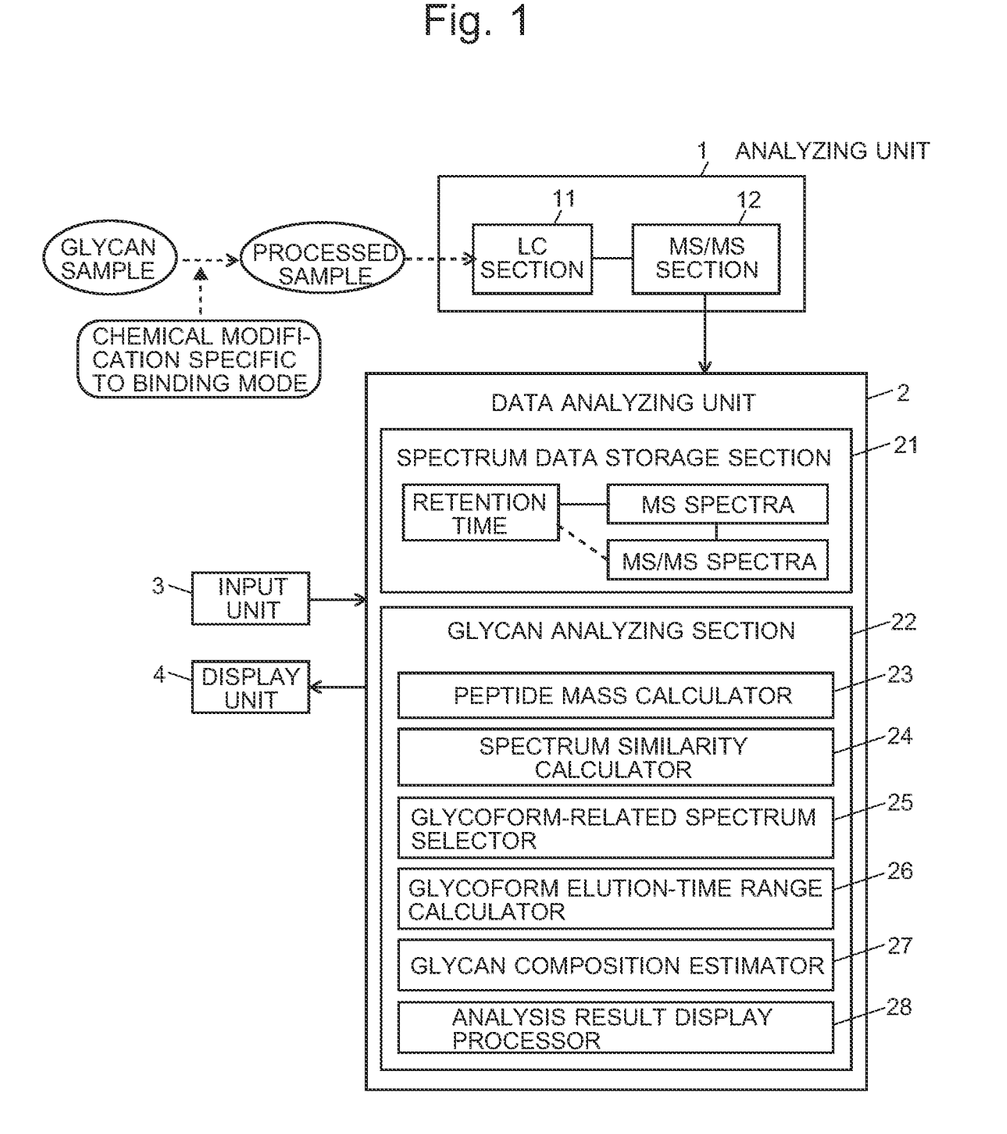
FIG. 1 is a block configuration diagram of the main component of a glycopeptide analyzer as one embodiment of the present invention.

A glycopeptide analyzer as one embodiment of the present invention is hereinafter described with reference to the attached drawings. FIG. 1 is a block configuration diagram of the main components of the glycopeptide analyzer according to the present embodiment.

The present glycopeptide analyzer includes an analyzing unit 1 configured to perform a predetermined analysis on a sample to collect data, a data analyzing unit 2 configured to analytically process the collected data, an input unit 3 and a display unit 4. The analyzing unit 1 includes a liquid chromatograph section (LC section) 11 using a reverse-phase column and a mass spectrometry section (MS/MS section) 12 capable of MS/MS analysis.

The data analyzing unit 2 includes, as its functional blocks, a spectrum data storage section 21 and a glycan analyzing section 22 as its functional blocks. The glycan analyzing section 22 includes a peptide mass calculator 23, spectrum similarity calculator 24, glycoform-related spectrum selector 25, glycoform elution-time range calculator 26, glycan composition estimator 27, analysis result display processor 28 and other components.

In the analyzing unit 1, the mass spectrometry section 12 is, for example, an ion trap time-of-flight mass spectrometer including an electrospray ionization (ESI) source. This mass spectrometer may be configured to repeatedly perform a mass spectrometric analysis while a portion or the entirety of the eluate from the column of the liquid chromatograph section 11 is directly introduced into the ion source. As an alternative to the configuration having the liquid chromatograph section 11 directly connected to the mass spectrometry section 12, the analyzing unit 1 may be configured to prepare a plurality of samples by preparative fractionation of the eluate after separating the components in the eluate by the liquid chromatograph section 11, and to perform a mass spectrometric analysis of each of those samples in the mass spectrometry section 12. In that case, a MALDI-IT-TOFMS employing a matrix-assisted laser-desorption/ionization (MALDI) source, or a similar type of mass spectrometer, can be used as the mass spectrometry section 12.

In the present device, the data analyzing unit 2 may actually be a multi-purpose personal computer or more sophisticated workstation, with the functions of the functional blocks shown in FIG. 1 realized by running, on the aforementioned type of computer, a dedicated data-processing program installed on the same computer. It should be noted that, in the case of performing a database search as will be described later, the data analyzing unit 2 may include the database itself as its component, or it may be configured to access an external database and only retrieve necessary pieces of data from the database.

Figure 2:
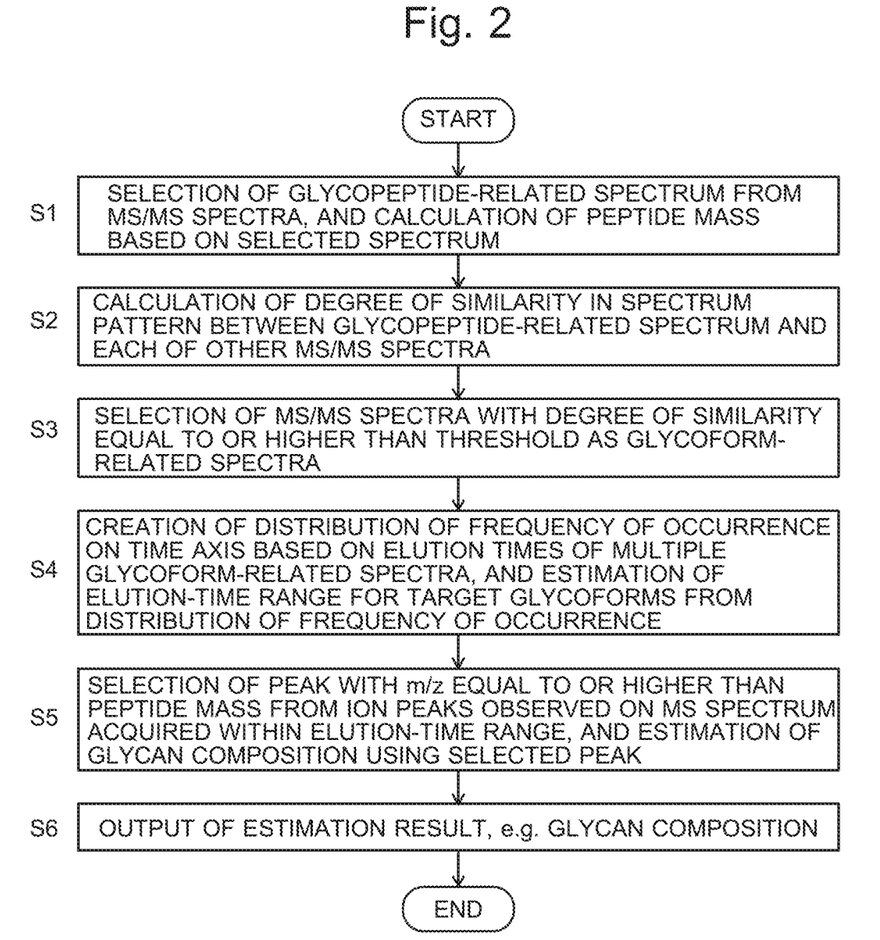
FIG. 2 is a flowchart showing the steps of an analyzing process in the glycopeptide analyzer according to the present embodiment.
Figure 3:
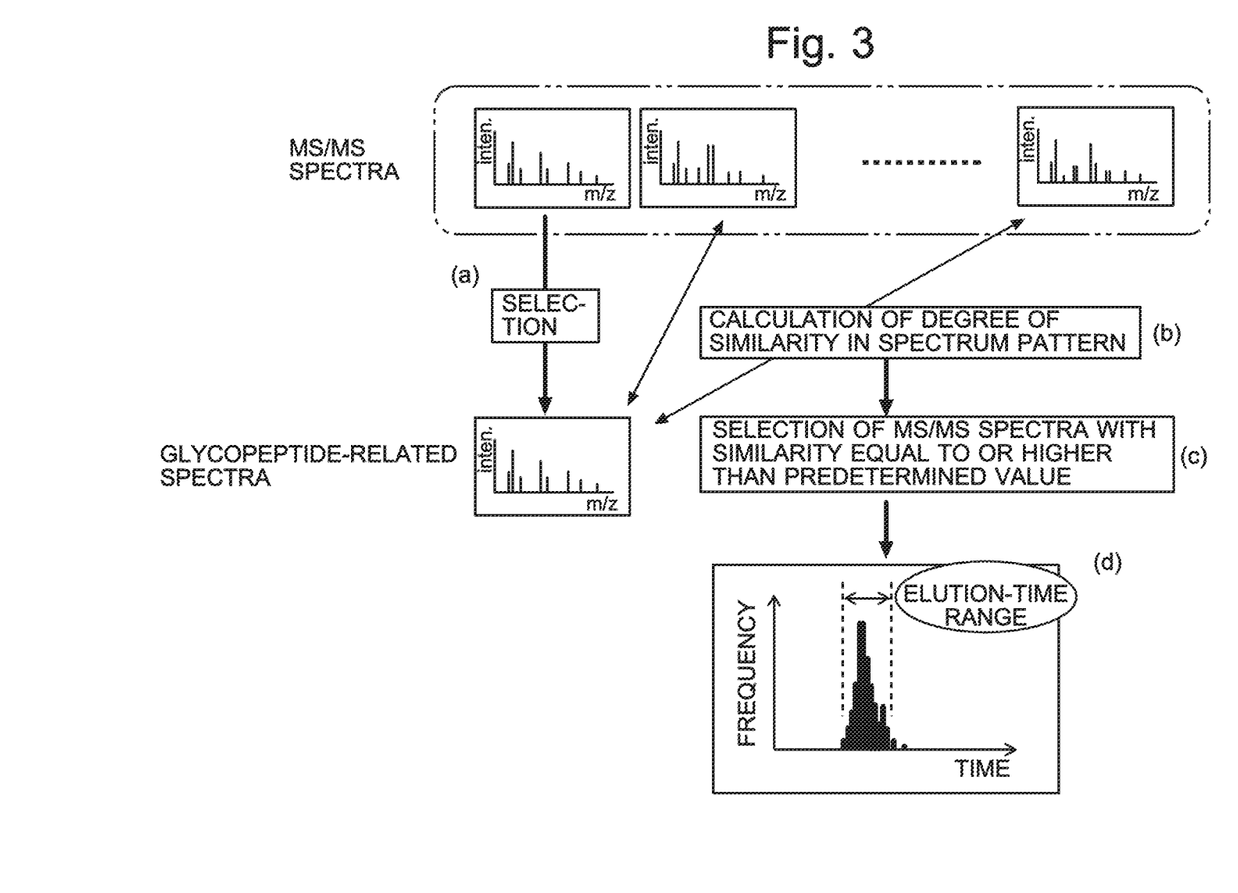
FIG. 3 is a chart illustrating the steps of estimating the glycoform elution-time range in the glycopeptide analyzer according to the present embodiment.

Next, one example of the analyzing operation using the glycopeptide analyzer according to the present embodiment is described with references to FIGS. 2 and 3 in addition to FIG. 1. FIG. 2 is a flowchart showing the steps of an analyzing process in the glycopeptide analyzer according to the present embodiment. FIG. 3 is a chart illustrating the steps of estimating the glycoform elution-time range in the glycopeptide analyzer according to the present embodiment.

A sample to be analyzed by the analyzing unit 1 is prepared by a user by a similar procedure to a conventional method: A target glycoprotein is initially purified and subsequently decomposed into glycopeptides by enzymatic digestion to obtain a peptide mixture. Then, the glycopeptides are selectively extracted from the peptide mixture and condensed.

In the case of analyzing glycopeptides modified with an acidic glycan like sialoglycan, a preprocessing employing a chemical modification specific to the binding mode of that acidic sugar may be performed on the sample before the sample is subjected to the LC/MS analysis. In other words, the peptide mixture to be subjected to the measurement may contain chemically modified glycopeptides.

The analyzing unit 1 performs an LC/MS analysis on the glycopeptide sample prepared in the previously described manner: The liquid chromatograph section 11 separates various glycopeptides in the sample from each other in the temporal direction. The mass spectrometry section 12 repeatedly performs a predetermined mass spectrometric analysis on the eluate coming from the column of the liquid chromatograph section 11. The mass spectrometric analysis performed by the mass spectrometry section 12 is an MS/MS analysis by data dependent acquisition. Specifically, in the mass spectrometry section 12, an MS analysis over a predetermined mass-to-charge-ratio range is initially performed to acquire a mass spectrum (MS spectrum). Subsequently, one or more peaks which satisfy predetermined selection conditions in the mass spectrum are selected, and an MS/MS analysis with the mass-to-charge ratio of each peak selected as a precursor ion is performed after the MS analysis. The set of one MS analysis and one or more MS/MS analyses is cyclically performed.

With the passage of time, the data acquired through the repetition of the MS analysis and MS/MS analyses are continuously sent from the analyzing unit 1 to the data analyzing unit 2, and stored in the spectrum data storage section 21. Thus, a set of data forming an MS spectrum and one or more sets of data forming MS/MS spectra related to the MS spectrum are stored for each retention time (elution time) in the spectrum data storage section 21.

In normal cases, a molecule-related ion peak of a glycopeptide has a high signal intensity. Therefore, by appropriately setting the selection conditions, a molecule-related ion peak of a glycopeptide can be efficiently selected and subjected to the MS/MS analysis. However, there is a temporal limitation on the number of times of the MS/MS analysis that can be performed after the MS analysis within the same cycle. If a large number of ions originating from the glycoforms that have the same peptide structure yet differ from each other in glycan structure (or other features) are observed on the mass spectrum, some of the glycopeptides will be missed in the MS/MS analysis. Accordingly, it is often the case that a glycopeptide whose molecule-related ion peak has been observed on the MS spectrum has no corresponding MS/MS spectrum acquired.

Based on the data collected in the previously described manner, the glycan analyzing section 22 performs an analytical processing as follows.

The peptide mass calculator 23 initially selects, from all MS/MS spectra, an MS/MS spectrum that is likely to be an MS/MS spectrum originating from a glycopeptide, i.e. an MS/MS spectrum that can be considered to have originated from a glycopeptide with a certain degree of likelihood, as a glycopeptide-related spectrum (see box (a) in FIG. 3). For each of the selected MS/MS spectra (glycopeptide-related spectra), the peptide mass calculator 23 estimates a peptide mass, i.e. the mass of only the peptide portion of the glycopeptide, from the information of the ion peak observed on the MS/MS spectrum (Step S1). The selection of the glycopeptide-related spectrum can be made, for example, by one of the following methods.

First Selection Method for Glycopeptide-Related Spectrum

The peptide mass calculator 23 collects information concerning significant peaks exclusive of noise peaks or other unnecessary peaks from each of the MS/MS spectra being processed, to create a peak list. Subsequently, the peptide mass calculator 23 attempts to identify a glycopeptide by a database search based on the peak list and a previously set search condition. An MS/MS spectrum from which a glycopeptide has been successfully identified is considered to be a glycopeptide-related spectrum.

The search condition for the database search may preferably include, for example, glycan (post-translational modification) information estimated from prior information, such as the presence of a modification by a specific kind of sugar or a modification by a fragment of a sugar. For the database search, an existing protein database search engine for proteome analysis can be used, such as "MS/MS Ions Search" included in Mascot, which is a system offered by Matrix Science, USA. Once the glycopeptide has been identified, it is possible to determine the amino-acid sequence of the peptide and estimate the peptide mass from that amino-acid sequence. It should be noted that, when a glycopeptide analysis using a protein database search is performed for MS/MS spectra, it is preferable to previously separate MS/MS spectra which are of glycopeptide origin from those which are not. This process will be described later.

Second Selection Method for Glycopeptide-Related Spectrum

If an MS/MS analysis including collision induced dissociation (CID) is performed for an ion of glycopeptide origin, the ion may preferentially be dissociated at the glycan portion rather than the peptide portion, producing ions originating from the peptide with sugar residues successively desorbed, i.e. glycan-fragment ions (oxonium ions) resulting from fragmentation of the glycan. Accordingly, the peptide mass calculator 23 determines whether or not such an oxonium ion is detected in each of the MS/MS spectra being processed. An MS/MS spectrum in which an oxonium ion has been detected is considered to be a glycopeptide-related spectrum. In the case where the glycopeptide being analyzed is an N-linked glycopeptide and the mass spectrometry section 12 is a mass spectrometer including an ESI ion source, the peak with the highest signal intensity in the MS/MS spectrum is assumed to be an N-linked glycopeptide fragment ion in which one N-acetylhexosamine (HexNAc) is bonded to the peptide, and the peptide mass is estimated from the mass-to-charge ratio of that peak.

In some cases, the oxonium ion peak may form the peak with the highest signal intensity in the MS/MS spectrum. Accordingly, the oxonium ion peak may be removed from the peak list before the process of detecting the peak with the highest signal intensity.

Third Selection Method for Glycopeptide-Related Spectrum

It is commonly known that characteristic triplet peaks (three peaks which appear with mass-to-charge-ratio intervals of 83 Da and 120 Da from the lower mass-to-charge-ratio side) will be observed on an MS/MS spectrum if the glycopeptide to be analyzed is an N-linked glycopeptide and a mass spectrometer including a MALDI ion source is used. Accordingly, the peptide mass calculator 23 determines whether or not the triplet peaks can be detected on the MS/MS spectrum being analyzed. An MS/MS spectrum on which the triplet peaks have been detected is considered to be a glycopeptide-related spectrum. The peak having the lowest mass-to-charge ratio among the triplet peaks is assumed to be the peptide ion from which only the glycan has been desorbed, and the peptide mass is estimated from the mass-to-charge ratio of this peak.

After a glycopeptide-related spectrum has been selected in Step S1, the spectrum similarity calculator 24 calculates, for each MS/MS spectrum, the degree of similarity, i.e. an index value showing the level of similarity in the spectrum pattern between one glycopeptide-related spectrum and each of the other MS/MS spectra (Step S2; see box (b) in FIG. 3).

In the case where the aforementioned glycan fragments (oxonium ions) are generated, those ions commonly appear from any glycopeptide. Therefore, if those ions are included in the calculation of the degree of similarity, even a glycoform which does not correspond to the same peptide will apparently have a high degree of similarity. In other words, oxonium ions become an interfering factor in identifying MS/MS spectra which originate from the same peptide. Accordingly, a processing for removing the known peaks originating from the oxonium ions from the glycopeptide-related spectrum as well as all MS/MS spectra to be compared with the glycopeptide-related spectrum may be performed before the calculation of the degree of similarity. Empirical knowledge shows that oxonium ions have low mass-to-charge ratios equal to or lower than m/z 500 or m/z 530, while the mass-to-charge ratios of the ions that reflect specific compositions (or the like) of a glycan are mostly larger than those values. Accordingly, all peaks included within a low mass-to-charge-ratio range which is equal to or lower than a previously specified mass-to-charge-ratio value, e.g. m/z 500 or 530, may be removed from the glycopeptide-related spectrum as well as all MS/MS spectra to be compared with the glycopeptide-related spectrum.

The glycoform-related spectrum selector 25 compares the value of the degree of similarity calculated for each MS/MS spectrum with a predetermined threshold, and selects only the MS/MS spectra whose degrees of similarity are higher than the threshold as the glycoform-related spectra (Step S3). In other words, only the MS/MS spectra which are considered to be significantly similar to the glycopeptide-related spectrum are selected as the glycoform-related spectra from the collected MS/MS spectra. A glycoform having the same peptide and a slightly different glycan structure, or a glycoform having the same glycan and a minor difference in binding mode or binding site, should have a high level of similarity in MS/MS spectrum pattern. Accordingly, the MS/MS spectra of a variety of glycoforms having the same peptide can be collected through the selection process in Step S3 (see box (c) in FIG. 3).

The glycoform elution-time range calculator 26 determines the number, or frequency of occurrence, of the MS/MS spectra selected in Step S3 for each of the elution times at which those MS/MS spectra have been acquired. This can be achieved by dividing the entire measurement period in the liquid chromatograph section 11 into segments of time having a predetermined duration, and calculating the frequency of occurrence for each segment of time. Based on the calculated result, the glycoform elution-time range calculator 26 creates a distribution of the frequency of occurrence (histogram) with respect to the elution time, as shown in chart (d) in FIG. 3. This histogram can be considered to be an indicator of the level of possibility of the elution of the glycoforms having the same peptide. Accordingly, the glycoform elution-time range calculator 26 estimates the elution-time range for glycoforms which can be considered as belonging to the same group, based on the width of the peak on the histogram, degree of dispersion of the peak waveform or other factors (Step S4).

After the elution-time range has been determined in Step S4, the glycan composition estimator 27 retrieves all MS spectra obtained within the elution-time range from the spectrum data storage section 21. From each of those MS spectra, the glycan composition estimator 27 extracts an ion peak showing a mass-to-charge ratio corresponding to a mass equal to or higher than the peptide mass determined in Step S1, and estimates the glycan composition based on the ion peak (Step S5). The method for estimating the glycan composition may be any method that is conventionally and commonly used. A possible example is a method including the steps of assuming an ion peak on an MS spectrum as an ion peak of glycopeptide origin, subtracting the peptide mass from the mass corresponding to that peak to obtain the mass of the glycan (which is actually a substance presumed to be the glycan), and searching for all possible glycans that match with that mass of the glycan. The "Glyco-peakfinder" described in Non Patent Literature 2 can be used for such a search for all possible glycans.

It is likely that an ion peak corresponding to a glycoform for which the MS/MS analysis could not be performed due to the previously described temporal limitation is observed in an MS spectrum acquired within the elution-time range. Therefore, the glycopeptide analyzer according to the present embodiment can estimate the glycan composition and structure of a glycoform which has been missed in the analysis based on the MS/MS spectra. Thus, an exhaustive analysis of glycoforms inclusive of those which could not be analyzed by conventional methods can be conducted.

The analysis result display processor 28 displays the analysis result of the estimated composition and structure of the glycan as well as the analysis result of the structure of the peptide (amino-acid sequence) and other pieces of information on the display unit 4 (Step S6).

In usual cases, multiple glycopeptide-related spectra are selected in Step S1 in the previous description. Accordingly, the processing of Steps S2 through S5 should preferably be repeated for each glycopeptide-related spectrum.

All MS spectra acquired within the elution-time range estimated in Step S4 may be merged together before the processing of Steps S5 and S6.

Measurement Example

Figure 4A:
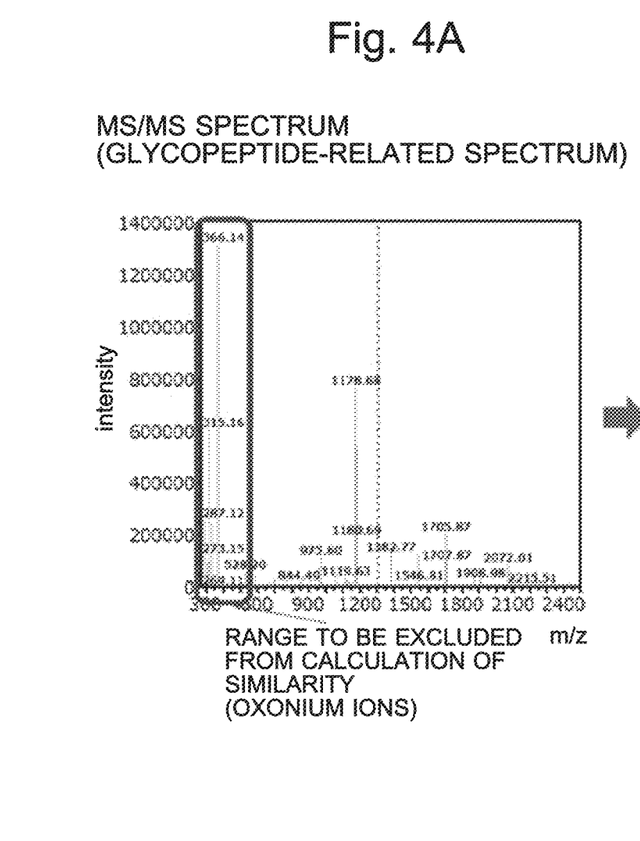
FIGS. 4A-4C are charts showing an actual example of the estimation of the glycoform elution-time range in the glycopeptide analyzer according to the present embodiment.

As a measurement example using the glycopeptide analyzer according to the present embodiment, an example of the estimation of the elution-time range of the glycoforms of alpha-1-acid glycoprotein is hereinafter described with references to FIGS. 4A-4C.

An LC/MS analysis of a sample derived from alpha-1-acid glycoprotein was performed. From the MS/MS spectra created from the data collected by the LC/MS analysis, a glycopeptide-related spectrum was selected by the second selection method (i.e. the method in which oxonium ions are detected). After the known peaks originating from the oxonium ions were removed from the selected glycopeptide-related spectrum and other MS/MS spectra (see FIG. 4A), the degree of similarity of each spectrum was calculated. The degree of similarity was calculated by the dot product method.

Figure 4B:
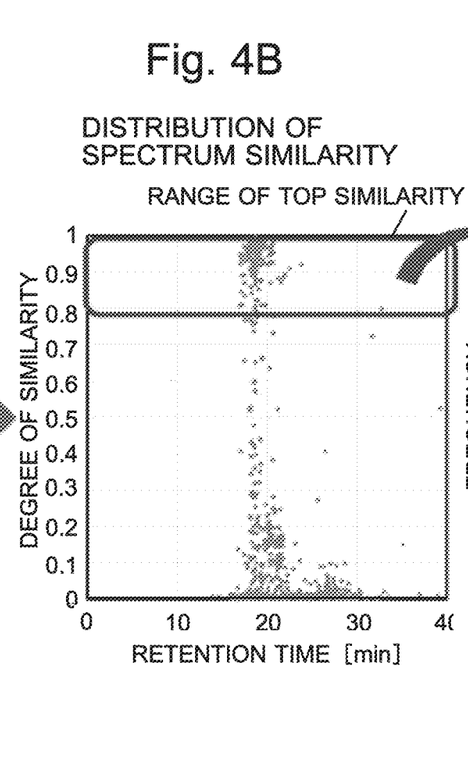

FIG. 4B shows the distribution of the degree of similarity calculated for each MS/MS spectrum. The threshold of the degree of similarity was set at 0.8, and the MS/MS spectra whose degrees of similarity were equal to or higher than 0.8 were selected as the glycoform-related spectra of the glycopeptide concerned. As can be seen in FIG. 4B, the dispersion of the elution times of the selected glycoform-related spectra is considerably smaller than that of the elution times of the original MS/MS spectra, i.e. the MS/MS spectra having low degrees of similarity.

Figure 4C:
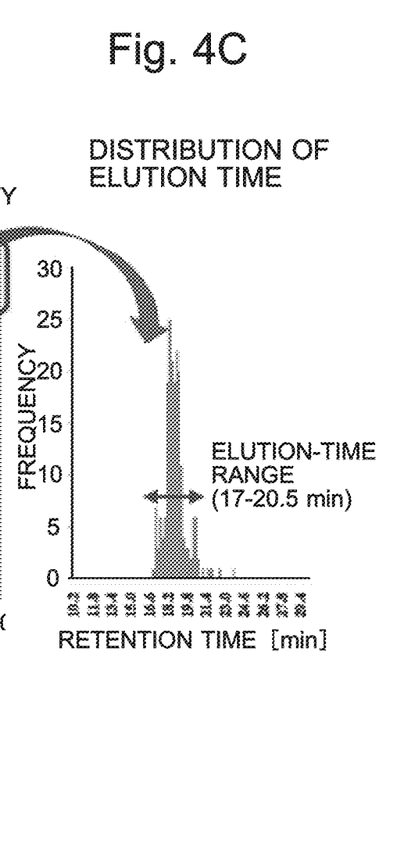

Then, a histogram of the selected glycoform-related spectra with respect to the elution time was created, as shown in FIG. 4C. Almost all glycoform-related spectra fell within a range of 17 to 20.5 minutes. Accordingly, it was determined that the glycoform elution-time range for the glycopeptide concerned was from 17 to 20.5 minutes.

Thus, the glycopeptide analyzer according to the present embodiment can determine an appropriate elution-time range for each peptide, using MS/MS spectra, so that practically all glycoforms are included within the elution-time range.

Selection and Classification of MS/MS Spectra

In the previously described embodiment of the glycopeptide analyzer, a method which uses a protein database search for MS/MS spectra has been presented as one example of the method for calculating the peptide mass in Step S1. In some cases, a glycopeptide may successfully be identified by a common type of protein database search for proteome analysis based on MS/MS spectra. However, it is normally the case that identification of the glycopeptide with a high degree of certainty is only achieved for some of the MS/MS spectra, so that an omission of identification inevitably occurs. In order to perform a glycopeptide analysis based on such unidentified MS/MS spectra, it is necessary to initially estimate the peptide mass. Commonly used methods for estimating the peptide mass are designed for N-linked glycopeptides. Therefore, it is necessary to previously divide MS/MS spectra into a group of MS/MS spectra which are of glycopeptide origin and a group of MS/MS spectra which are not of glycopeptide origin.

In other words, in order to perform an exhaustive structural analysis of a glycopeptide on a large number of MS/MS spectra acquired through measurements of a mixed sample of unknown glycopeptides, it is important to select MS/MS spectra of glycopeptide origin from the large number of MS/MS spectra, and to classify the selected MS/MS spectra for each different peptide structure of the glycopeptide. This requirement is not limited to the case of analyzing the glycan structure by the process steps shown in FIG. 2; it is also a common requirement to analyses of glycoproteins or glycopeptides based on MS/MS spectra.

Figure 5:
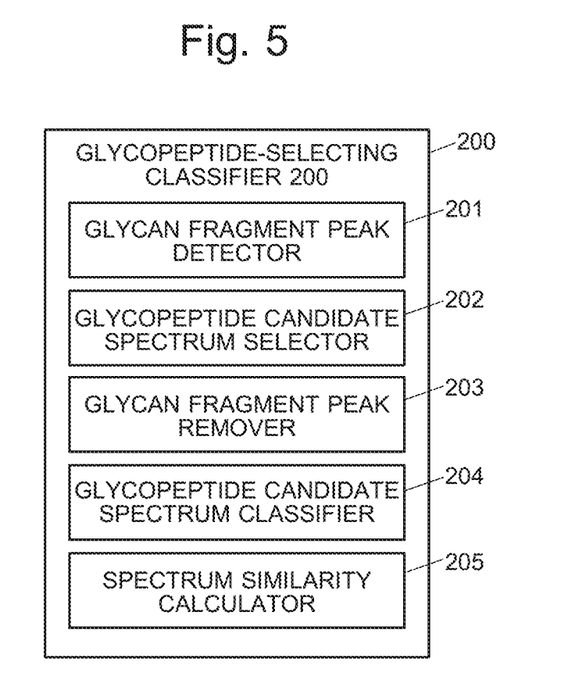
FIG. 5 is a block configuration diagram of the main component of a glycopeptide-selecting classifier for classifying glycopeptides to be analyzed by the glycopeptide analyzer according to the present embodiment.

FIG. 5 is a diagram showing the block configuration of a glycopeptide-selecting classifier 200 which can be added to the data analyzing unit 2 in the glycopeptide analyzer according to the embodiment shown in FIG. 1. The glycopeptide-selecting classifier 200 includes, as its functional blocks, a glycan fragment peak detector 201, glycopeptide candidate spectrum selector 202, glycan fragment peak remover 203, spectrum similarity calculator 204 and glycopeptide candidate spectrum classifier 205.

Figure 6:
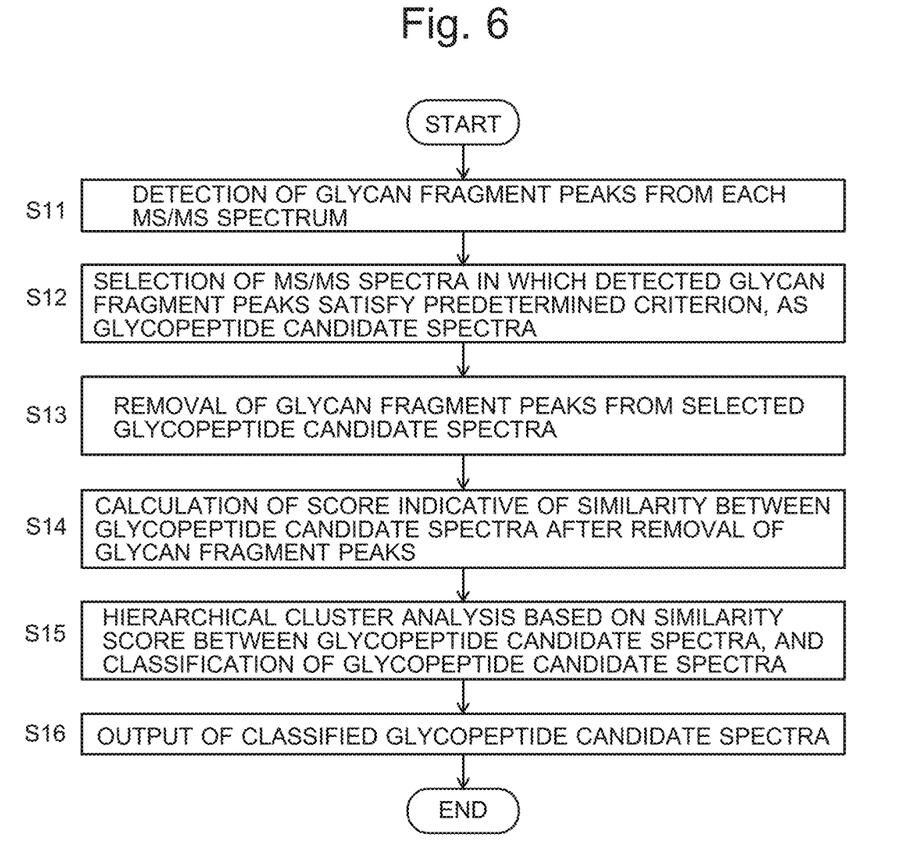
FIG. 6 is a flowchart showing the steps of the glycopeptide-classifying process in the glycopeptide-selecting classifier shown in FIG. 5.

FIG. 6 is a flowchart showing the process steps of the glycopeptide-selecting classifier 200.

The glycan fragment peak detector 201 detects peaks originating from known glycan-fragment ions (oxonium ions) on each of the MS/MS spectra being processed (Step S11). In the case where the glycan is chemically modified, the modified glycan-fragment ions may be included in the detection targets in addition to the glycan-fragment ions. An MS/MS spectrum on which no glycan-fragment ion peak can be detected is most likely to be an MS/MS spectrum which is not of glycopeptide origin, and therefore, is excluded in this step.

Next, the glycopeptide candidate spectrum selector 202 determines whether or not the glycan-fragment ion peaks detected in Step S11 satisfy a predetermined criterion, and selects, as a glycopeptide candidate spectrum, each MS/MS spectrum including glycan-fragment ion peaks which satisfy the predetermined criterion (Step S12). For example, the predetermined criterion may be the number of detected ion peaks being equal to or larger than a predetermined number, or the intensity of a specific glycan-fragment ion peak (e.g. N-acetylhexosamine (HexNAc)) being within a predetermined number of top peaks among all ion peaks in the MS/MS spectrum concerned. A glycan-fragment ion peak detected in Step S11 may actually be the peak of a different ion whose mass happens to be equal or extremely close to the mass of a glycan-fragment ion. At least some of such cases are excluded in this step.

Subsequently, the glycan fragment peak remover 203 removes glycan-fragment ion peaks from each of the selected glycopeptide candidate spectra (Step S13). For this removal, a method may be used which removes all peaks included within a predetermined mass-to-charge-ratio range that includes principal glycan-fragment ions (e.g. equal to or lower than m/z 530), instead of simply removing all detected glycan-fragment ion peaks.

According to a predetermined algorithm (e.g. the dot product method), the spectrum similarity calculator 204 calculates the degree of similarity between the glycopeptide candidate spectra from which the peaks originating from the glycan-fragment ions have been removed (Step S14). As for the score which indicates the degree of similarity, a scoring technique commonly known as a library-searching technique for peptides or metabolites can be used.

The glycopeptide candidate spectrum classifier 205 performs a hierarchical cluster analysis using the degrees of similarity between the glycopeptide candidate spectra obtained in Step S14, and classifies the glycopeptide candidate spectra based on the result of the analysis (Step S15). The MS/MS spectra (glycopeptide candidate spectra) selected and classified in this manner are outputted as the target of the previously described analytical processing in the glycan analyzing section 22 (Step S16). As the method for calculating the distance between the spectra in the hierarchical cluster analysis, the Euclidean distance can be used, for example. As for the method for measuring the distance between clusters, the Ward's Method can be used.

In Steps S14 and S15, the large number of glycopeptide candidate spectra for which the degree of similarity should be calculated may be divided into predetermined elution-time ranges, and the degree of similarity may be calculated between the glycopeptide candidate spectra within each elution-time range. For example, if the entire elution time is 60 minutes, this period can be divided into a total of 12 elution-time ranges, 5 minutes each, and the hierarchical cluster analysis can be performed for the glycopeptide candidate spectra included within each elution-time range. It is also possible to determine the degree of similarity between the glycopeptide candidate spectra included within a predetermined range of elution time (e.g. 3 minutes). Needless to say, after the degrees of similarity between the glycopeptide candidate spectra have been determined across the entire elution time, the entire elution time may be appropriately divided, and the results obtained from unnecessary elution-time ranges may be removed. The duration of the elution-time range by which the entire elution time should be divided, or the length of the elution time to be excluded from the calculation of the degree of similarity, can be determined based on appropriate information, such as the distribution of the known elution times of the glycopeptides.

Figure 7:
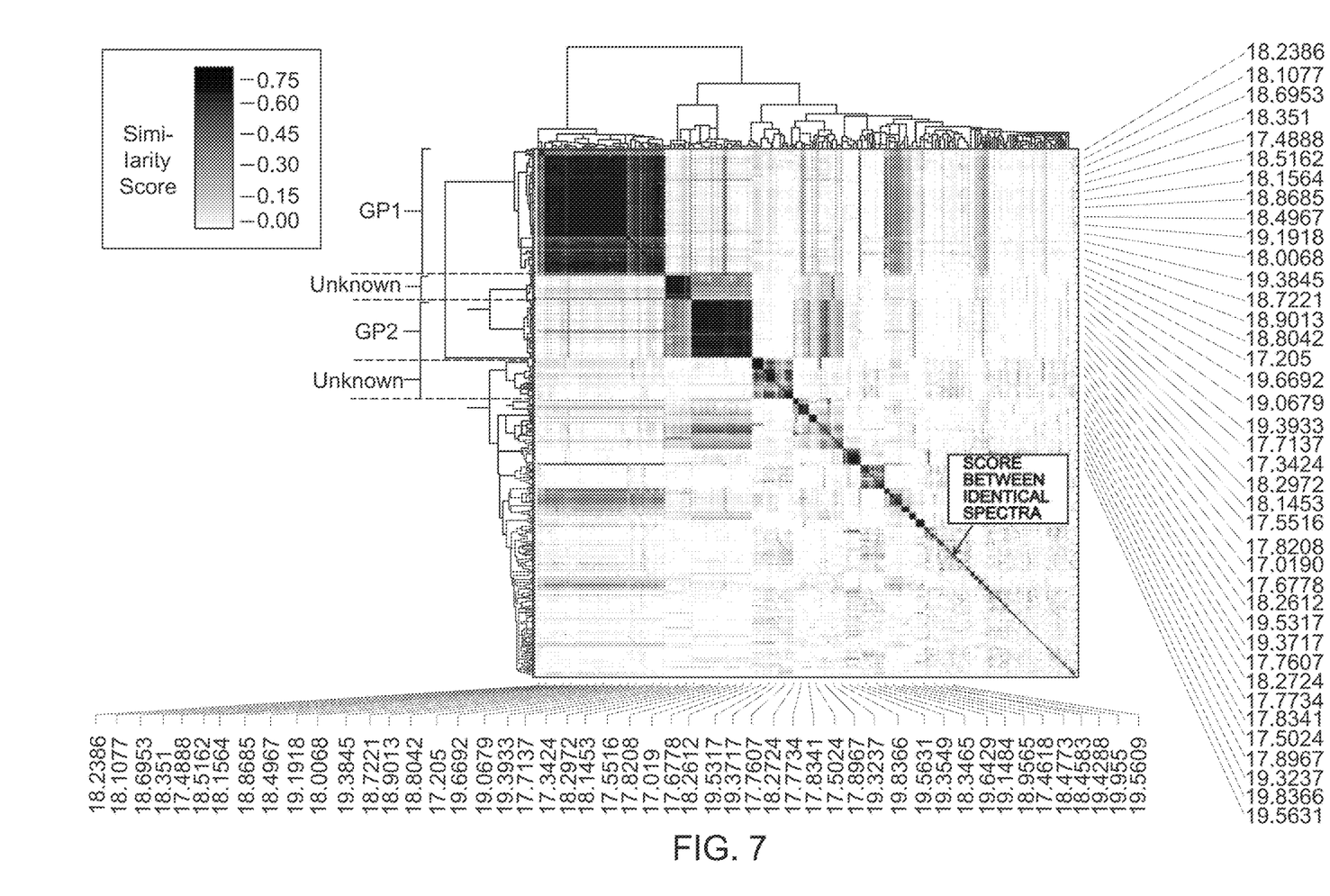
FIG. 7 is a chart showing one example of the result of the classification by a hierarchical cluster analysis in the glycopeptide-selecting classifier.

FIG. 7 is a chart showing one example of the result of the cluster analysis in the case where the previously described processing was performed on MS/MS spectra acquired by performing an LC-MS/MS analysis on a mixed sample of alpha-1-acid glycoprotein. Each of the vertical and horizontal axes in FIG. 7 shows MS/MS spectra represented by elution time and arranged in the same order, with the degree of similarity between two MS/MS spectra represented in gray scale at each point of intersection of the grid. Accordingly, the diagonal line extending from top left to bottom right at an angle of 45 degrees in FIG. 7 represents the degree of similarity between the same MS/MS spectra. The chart is symmetrical with respect to the diagonal line.

As can be seen in FIG. 7, the MS/MS spectra are divided into a plurality of different glycopeptide clusters. The two clusters labelled "GP1" and "GP2" were glycopeptide candidate spectra which could be identified by database search with a high level of reliability. On the other hand, the clusters labelled "Unknown" were unidentified glycopeptide candidate spectra. Thus, by preliminarily performing the selection and classification of a large number of MS/MS spectra before the previously described analytical processing is performed in the glycan analyzing section 22, the efficiency of the identification of glycopeptides by database search can be improved, and analysis results which may possibly include incorrect identification can be decreased. Furthermore, useless analytical processing can be avoided since MS/MS spectra for which no glycopeptide needs to be identified are previously removed.

It should be noted that the previous embodiment and its modified examples are mere examples of the present invention, and any change, modification, addition or the like appropriately made within the spirit of the present invention will naturally fall within the scope of claims of the present application.

Various Modes of Invention

A person skilled in the art can understand that the previously described illustrative embodiment is a specific example of the following modes of the present invention.

(Clause 1) A glycopeptide analyzer according to one mode of the present invention is a glycopeptide analyzer configured to perform a structural analysis on the glycoforms of a glycoprotein using an analyzing device including a liquid chromatograph coupled with a mass spectrometer capable of MS/MS analysis, the glycopeptide analyzer including:

a spectrum creator configured to create an MS/MS spectrum for each elution time, based on data acquired by analyzing a sample containing glycopeptides originating from a target glycoprotein by the analyzing device;

a peptide mass calculator configured to select a glycopeptide-related spectrum which is likely to have originated from a glycopeptide, from a plurality of MS/MS spectra created by the spectrum creator for different elution times, and to calculate the mass of a peptide in the selected glycopeptide based on the glycopeptide-related spectrum;

a spectrum similarity determiner configured to determine a similarity between the glycopeptide-related spectrum and each of the other MS/MS spectra or each MS/MS spectrum corresponding to a specific range of time;

a glycoform-related spectrum selector configured to select, as a glycoform-related spectrum for the glycopeptide concerned, an MS/MS spectrum having a high level of similarity with the glycopeptide-related spectrum;

a glycoform elution-time range estimator configured to determine a distribution of the frequency of occurrence of the selected glycoform-related spectrum on a time axis, and to estimate a glycoform elution-time range based on the distribution; and a glycan composition estimator configured to select, from ion peaks detected on an MS spectrum collected within the estimated glycoform elution-time range, an ion peak corresponding to a mass greater than a peptide mass calculated by the peptide mass calculator, and to estimate a glycan composition by using the ion peak.

The glycopeptide analyzer described in Clause 1 can easily yet accurately estimate the elution-time range of glycoforms for each peptide based on an objective index, i.e. a degree of spectral similarity. This enables the estimation of the glycan composition of each glycoform without omission, from an enormous amount of data collected from a sample of the glycopeptide and peptide mixtures. Conversely, MS spectra which are unlikely to include a glycoform related to a glycopeptide can be excluded from the target of the estimation of the glycan composition. This reduces the amount of time required for the estimation of the glycan composition as well as improves the estimation accuracy. The amount of time and labor for verifying the results of the estimation of the glycan composition can also be reduced.

(Clause 2) In the glycopeptide analyzer described in Clause 1, the peptide mass calculator may be configured to perform glycopeptide identification by a database-searching technique based on each MS/MS spectrum, and to select, as a glycopeptide-related spectrum, an MS/MS spectrum for which a glycopeptide has been successfully identified.

The glycopeptide analyzer described in Clause 2 can select glycopeptide-related spectra for a peptide modified with an N-link glycan as well as a peptide including an O-linked glycan.

(Clause 3) In the glycopeptide analyzer described in Clause 1, the peptide mass calculator may be configured to select, as a glycopeptide-related spectrum, an MS/MS spectrum in which an oxonium ion is detected, and to calculate the mass of the peptide on the assumption that the peak having the highest signal intensity in the MS/MS spectrum is a fragment ion of an N-linked glycopeptide in which one N-acetylhexosamine is bonded to the peptide.

The glycopeptide analyzer described in Clause 3 can satisfactorily select a glycopeptide-related spectrum and calculate its peptide mass, particularly in the case where the glycopeptide to be analyzed is an N-linked glycopeptide and the LC/MS analysis is performed with an analyzing device employing a mass spectrometer including an ESI ion source as the ion source.

(Clause 4) In the glycopeptide analyzer described in Clause 1, the peptide mass calculator may be configured to select, as a glycopeptide-related spectrum, an MS/MS spectrum in which triplet peaks characteristic of an N-linked glycopeptide is detected, and to calculate the mass of the peptide on the assumption that the ion peak having the smallest mass among the triplet peaks in the MS/MS spectrum is a peptide ion from which only the glycan is desorbed.

The glycopeptide analyzer described in Clause 4 can satisfactorily select a glycopeptide-related spectrum and calculate its peptide mass, particularly in the case where the LC/MS analysis is performed with an analyzing device employing a mass spectrometer including a MALDI ion source as the ion source.

(Clause 5) In the glycopeptide analyzer described in one of Clauses 1-4, the spectrum similarity determiner may be configured to remove a peak of oxonium-ion origin from the glycopeptide-related spectrum as well as from all other MS/MS spectra or MS/MS spectra corresponding to a specific range of time, before determining the similarity of spectra.

The glycopeptide analyzer described in Clause 5 can improve the accuracy of the calculation of the degree of similarity of the MS/MS spectra and thereby improve the appropriateness of the elution-time range of the glycoforms. Consequently, fewer glycoforms will be omitted.

(Clause 6) The glycopeptide analyzed described in one of Clauses 1-5 may further include an analysis controller configured to control an operation of the mass spectrometer so as to acquire an MS spectrum by performing an MS analysis in the mass spectrometer, and to perform an MS/MS analysis after the MS analysis, where the mass-to-charge ratio of a peak satisfying a predetermined condition among the peaks detected in the MS spectrum is set as a precursor ion in the MS/MS analysis.

In the glycopeptide analyzer described in Clause 6, if a glycopeptide or similar component is contained in an eluate from the liquid chromatograph, the glycopeptide analyzer can automatically acquire an MS/MS spectrum for that component. By appropriately setting the predetermined condition for selecting the precursor ion, the analyzer can avoid performing the MS/MS analysis for unnecessary components contained in the eluate, such as foreign substances. This leads to a corresponding increase in the opportunity for the MS/MS analysis to be performed for significant components.

(Clause 7) The glycopeptide analyzer described in one of Clauses 1-6 may further include:

a glycan fragment detector configured to detect a glycan fragment peak from each of the plurality of MS/MS spectra created by the spectrum creator;

a glycopeptide candidate spectrum selector configured to select, as a glycopeptide candidate spectrum, each MS/MS spectrum in which the detected glycan fragment peak satisfies a predetermined criterion;

a glycan fragment remover configured to remove the glycan fragment peak from each selected glycopeptide candidate spectrum;

a spectrum similarity calculator configured to calculate a degree of similarity in peak pattern between glycopeptide candidate spectra with the glycan fragment peak removed; and a spectrum classifier configured to perform a cluster analysis based on the degree of similarity, and to classify glycopeptide candidate spectra into one or more groups according to a predetermined criterion, where the glycopeptide candidate spectra classified into groups by the spectrum classifier are partially or entirely subjected to processing by the peptide mass calculator.

The glycopeptide analyzer described in Clause 7 can select, from a large number of MS/MS spectra acquired through measurements of a mixed sample of unknown glycopeptides, MS/MS spectra which are likely to have originated from glycopeptides, and further divide the selected spectra into groups each of which includes peptides having identical or similar peptide structures, before analytically processing those spectra. Thus, the glycopeptide structure analysis can be performed without omission based on a large number of MS/MS spectra. Incorrect identifications can also be decreased, so that a highly accurate glycopeptide analysis can be performed.

The glycopeptide analyzer described in Clause 7 is not limited to the glycopeptide analyzers described in Clauses 1-6; it is also useful as a technique for preprocessing MS/MS spectra in a glycopeptide analysis employing a different technique. In other words, when an exhaustive glycopeptide structure analysis is to be performed based on MS/MS spectra acquired through measurements of a mixed sample of unknown glycopeptides, the glycopeptide analyzer described in Clause 8 can be used for the purpose of performing the glycopeptide analysis with a minimum amount of omission as well as decreasing incorrect identifications to improve the estimation accuracy of the analysis.

(Clause 8) A glycopeptide analyzer according to the second mode of the present invention developed for solving the previously described problem is a glycopeptide analyzer configured to perform a structural analysis on a glycoprotein using an analyzing device including a liquid chromatograph coupled with a mass spectrometer capable of MS/MS analysis, the glycopeptide analyzer including:

a spectrum creator configured to create an MS/MS spectrum for each elution time, based on data acquired by analyzing a sample containing glycopeptides originating from a target glycoprotein by the analyzing device;

a glycan fragment detector configured to detect a glycan fragment peak from each of the plurality of MS/MS spectra created by the spectrum creator;

a glycopeptide candidate spectrum selector configured to select, as a glycopeptide candidate spectrum, each MS/MS spectrum in which the detected glycan fragment peak satisfies a predetermined criterion;

a glycan fragment remover configured to remove the glycan fragment peak from each selected glycopeptide candidate spectrum;

a spectrum similarity calculator configured to calculate a degree of similarity in peak pattern between glycopeptide candidate spectra with the glycan fragment peak removed; and a spectrum classifier configured to perform a cluster analysis based on the degree of similarity, and to classify glycopeptide candidate spectra into one or more groups according to a predetermined criterion.

The glycopeptide analyzer described in Clause 8 can perform a glycopeptide analysis with a minimum amount of omission when an exhaustive glycopeptide structure analysis is to be performed based on MS/MS spectra acquired through measurements of a mixed sample of unknown glycopeptides. It can also decrease incorrect identifications and improve the estimation accuracy of the analysis.

(Clause 9) The glycopeptide analyzer described in Clause 8 may further include a peptide mass calculator configured to calculate, based on the glycopeptide candidate spectra classified into one or more groups, the mass of a peptide in the glycopeptide for each of the groups or for any one of the groups.

(Clause 10) The glycopeptide analyzer described in Clause 9 may further include a glycan composition estimator configured to estimate the glycan composition of a glycopeptide, using an MS spectrum having the same elution time as one glycopeptide candidate spectrum and the mass of the peptide determined from the glycopeptide candidate spectrum.

The glycopeptide analyzers described in Clauses 9 and 10 can exhaustively and accurately determine the glycan compositions of glycopeptides based on an enormous amount of data acquired through LC/MS analyses of a mixed sample of glycopeptides.

REFERENCE SIGNS LIST

1 . . . Analyzing Unit
11 . . . Liquid Chromatograph Section
12 . . . Mass Spectrometry Section
2 . . . Data Analyzing Unit
21 . . . Spectrum Data Storage Section
22 . . . Glycan Analyzing Section
23 . . . Peptide Mass Calculator
24 . . . Spectrum Similarity Calculator
25 . . . Glycoform-Related Spectrum Selector
26 . . . Glycoform Elution-Time Range Calculator
27 . . . Glycan Composition Estimator
28 . . . Analysis Result Display Processor
3 . . . Input Unit
4 . . . Display Unit
200 . . . Glycopeptide-Selecting Classifier
201 . . . Glycan Fragment Peak Detector
202 . . . Glycopeptide Candidate Spectrum Selector
203 . . . Glycan Fragment Peak Remover
204 . . . Spectrum Similarity Calculator
205 . . . Glycopeptide Candidate Spectrum Classifier

The invention claimed is:

1. A glycopeptide analyzer configured to perform a structural analysis on glycoforms of a glycoprotein using an analyzing device including a liquid chromatograph coupled with a mass spectrometer capable of MS/MS analysis, the glycopeptide analyzer comprising:

a spectrum creator configured to create an MS/MS spectrum for each elution time, based on data acquired by analyzing a sample containing glycopeptides originating from a target glycoprotein by the analyzing device;

a peptide mass calculator configured to select a glycopeptide-related spectrum which is likely to have originated from a glycopeptide, from a plurality of MS/MS spectra created by the spectrum creator for different elution times, and to calculate a mass of a peptide in the selected glycopeptide based on the glycopeptide-related spectrum;

a spectrum similarity determiner configured to determine a similarity between the glycopeptide-related spectrum and each of the other MS/MS spectra or each MS/MS spectrum corresponding to a specific range of time;

a glycoform-related spectrum selector configured to select, as a glycoform-related spectrum for the glycopeptide concerned, an MS/MS spectrum having a high level of similarity with the glycopeptide-related spectrum;

a glycoform elution-time range estimator configured to determine a distribution of a frequency of occurrence of the selected glycoform-related spectrum on a time axis, and to estimate a glycoform elution-time range based on the distribution; and a glycan composition estimator configured to select, from ion peaks detected on an MS spectrum collected within the estimated glycoform elution-time range, an ion peak corresponding to a mass greater than a peptide mass calculated by the peptide mass calculator, and to estimate a glycan composition by using the ion peak.

2. The glycopeptide analyzer according to claim 1, wherein the peptide mass calculator is configured to perform glycopeptide identification by a database-searching technique based on each MS/MS spectrum, and to select, as a glycopeptide-related spectrum, an MS/MS spectrum for which a glycopeptide has been successfully identified.

3. The glycopeptide analyzer according to claim 1, wherein the peptide mass calculator is configured to select, as a glycopeptide-related spectrum, an MS/MS spectrum in which an oxonium ion is detected, and to calculate the mass of the peptide on an assumption that a peak having a highest signal intensity in the MS/MS spectrum is a fragment ion of an N-linked glycopeptide in which one N-acetylhexosamine is bonded to the peptide.

4. The glycopeptide analyzer according to claim 1, wherein the peptide mass calculator is configured to select, as a glycopeptide-related spectrum, an MS/MS spectrum in which triplet peaks characteristic of an N-linked glycopeptide is detected, and to calculate the mass of the peptide on an assumption that an ion peak having a smallest mass among the triplet peaks in the MS/MS spectrum is a peptide ion from which only the glycan is desorbed.

5. The glycopeptide analyzer according to claim 1, wherein the spectrum similarity determiner is configured to remove a peak of oxonium-ion origin from the glycopeptide-related spectrum as well as from all other MS/MS spectra or MS/MS spectra corresponding to a specific range of time, before determining the similarity of spectra.

6. The glycopeptide analyzer according to claim 1, further comprising an analysis controller configured to control an operation of the mass spectrometer so as to acquire an MS spectrum by performing a normal MS analysis in the mass spectrometer, and to perform an MS/MS analysis after the MS analysis, where a mass-to-charge ratio of a peak satisfying a predetermined condition among peaks detected in the MS spectrum is set as a precursor ion in the MS/MS analysis.

7. The glycopeptide analyzer according to claim 1, further comprising:

a glycan fragment detector configured to detect a glycan fragment peak from each of the plurality of MS/MS spectra created by the spectrum creator;

a glycopeptide candidate spectrum selector configured to select, as a glycopeptide candidate spectrum, each MS/MS spectrum in which the detected glycan fragment peak satisfies a predetermined criterion;

a glycan fragment remover configured to remove the glycan fragment peak from each selected glycopeptide candidate spectrum;

a spectrum similarity calculator configured to calculate a degree of similarity in peak pattern between glycopeptide candidate spectra with the glycan fragment peak removed; and a spectrum classifier configured to perform a cluster analysis based on the degree of similarity, and to classify glycopeptide candidate spectra into one or more groups according to a predetermined criterion, where the glycopeptide candidate spectra classified into groups by the spectrum classifier are partially or entirely subjected to processing by the peptide mass calculator.

8. A glycopeptide analyzer configured to perform a structural analysis on a glycoprotein using an analyzing device including a liquid chromatograph coupled with a mass spectrometer capable of MS/MS analysis, the glycopeptide analyzer comprising:

a spectrum creator configured to create an MS/MS spectrum for each elution time, based on data acquired by analyzing a sample containing glycopeptides originating from a target glycoprotein by the analyzing device;

a glycan fragment detector configured to detect a glycan fragment peak from each of the plurality of MS/MS spectra created by the spectrum creator;

a glycopeptide candidate spectrum selector configured to select, as a glycopeptide candidate spectrum, each MS/MS spectrum in which the detected glycan fragment peak satisfies a predetermined criterion;

a glycan fragment remover configured to remove the glycan fragment peak from each selected glycopeptide candidate spectrum;

a spectrum similarity calculator configured to calculate a degree of similarity in peak pattern between glycopeptide candidate spectra with the glycan fragment peak removed; and a spectrum classifier configured to perform a cluster analysis based on the degree of similarity, and to classify glycopeptide candidate spectra into one or more groups according to a predetermined criterion.

9. The glycopeptide analyzer according to claim 8, further comprising a peptide mass calculator configured to calculate, based on the glycopeptide candidate spectra classified into one or more groups, a mass of a peptide in the glycopeptide for each of the groups or for any one of the groups.

10. The glycopeptide analyzer according to claim 9, further comprising a glycan composition estimator configured to estimate a glycan composition of a glycopeptide, using an MS spectrum having a same elution time as one glycopeptide candidate spectrum and the mass of the peptide determined from the glycopeptide candidate spectrum.

* * * * *